May 27, 1969  N. D. ROMANOS  3,445,918
METHOD OF FABRICATING A SPHERICAL VESSEL
Filed Dec. 30, 1966  Sheet 1 of 6

INVENTOR.
NICHOLAS D. ROMANOS
BY John F. Carney
ATTORNEY

May 27, 1969 N. D. ROMANOS 3,445,918
METHOD OF FABRICATING A SPHERICAL VESSEL
Filed Dec. 30, 1966 Sheet 2 of 6

INVENTOR.
NICHOLAS D. ROMANOS
BY *John F. Carney*
ATTORNEY

May 27, 1969        N. D. ROMANOS        3,445,918

METHOD OF FABRICATING A SPHERICAL VESSEL

Filed Dec. 30, 1966        Sheet 3 of 6

INVENTOR.
NICHOLAS D. ROMANOS
BY John F. Carney
ATTORNEY

May 27, 1969        N. D. ROMANOS        3,445,918

METHOD OF FABRICATING A SPHERICAL VESSEL

Filed Dec. 30, 1966

INVENTOR.
NICHOLAS D. ROMANOS
BY
*John F. Carney*
ATTORNEY

United States Patent Office 3,445,918
Patented May 27, 1969

3,445,918
METHOD OF FABRICATING A SPHERICAL VESSEL
Nicholas D. Romanos, Chattanooga, Tenn., assignor to Combustion Engineering, Inc., Windsor, Conn., a corporation of Delaware
Filed Dec. 30, 1966, Ser. No. 606,357
Int. Cl. B23k *31/02, 1/20;* B65d *7/04*
U.S. Cl. 29—471.1                                           10 Claims

ABSTRACT OF THE DISCLOSURE

A method of fabricating a spherical vessel wherein the structural elements that make up the vessel are circular discs that are dished to the curvature desired to form the vessel. The disc are weldedly assembled into a skeletal spherical structure and circular cuts are made around paths that intersect the loci of attachment between adjacent discs. The circular openings created thereby are then filled by other, similarly formed circular discs to complete the vessel. In one form of the invention the skeletal structure is provided by connecting discs in edge-to-edge relation. In another form, it is provided by spacing the discs and interconnecting them by connectors having the desired curvature.

Background of the invention

Spherical vessels have been fabricated in the past from metal plate material which has been cut into various shapes in the shop, then dished to the curvature desired to form spherical sections. The sections were thereafter welded or riveted together to form the spherical vessels. Some vessels have been formed of plate sections that are sometimes referred to as "orange peel" sections, the curved edges of which extend along great circles of the sphere. Where the vessel to be produced was large, circular plates that had been dished were generally used at the two poles of the sphere and the vessel body between the polar plates formed of several rows of courses of truncated, "orange peel" sections.

Since the material from which such vessels are made is generally provided in the form of rectangular plates the "orange peel" method and particularly the modification thereof in which circular polar plates are employed, occasion an excessive amount of scrap or waste plate material. Moreover, much time and effort is required to produce the irregular shapes necessary to fabricate the sections. In order to reduce this amount of scrap, together with the time and effort required to fabricate the sections, the present invention discloses a manner of fabricating a spherical vessel wherein each of the sections that comprise the sphere are formed of dished circular discs. By means of the present arrangement the fabrication steps, consisting of the cutting and welding of the metal plates, are greatly facilitated in that, they can be accomplished by simple relative movement along a circular path between the tool and the workpiece. This greatly reduces the amount of time, effort and expense necessary for the fabrication of spherical vessels.

Summary of the invention

A method of fabricating a spherical vessel comprising the steps of (a) forming each of a number of circular discs as sections of a hollow sphere of desired curvature; (b) attaching a plurality of said discs in assembled relation to form a generally spherical skeletal structure; (c) removing the material from said skeletal structure along circular paths that intersect the points of attachment of adjacent discs around the spaces between the attached sections; and (d) locating and attaching the remaining discs in the circular openings formed by said material removal to complete the spherical surface of the vessel.

Content of the drawings

Figure 1:
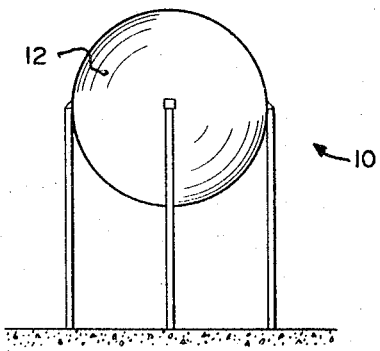
Figure 2:
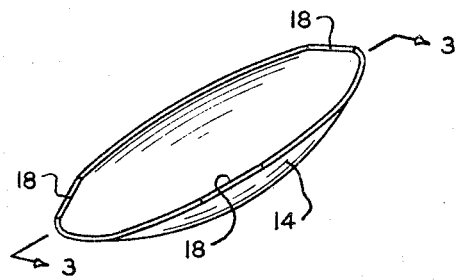
Figure 3:
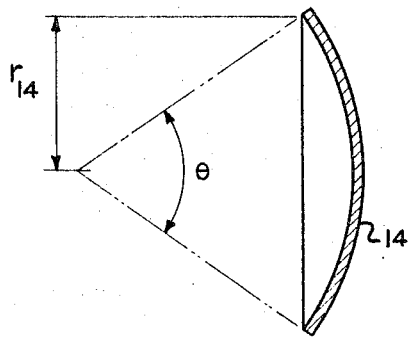
Figure 4:
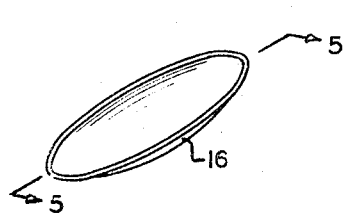
Figure 5:
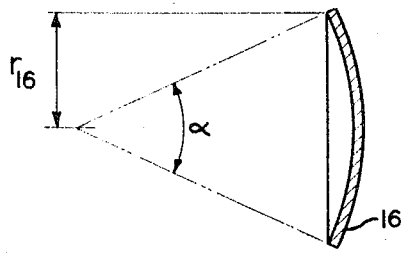
Figure 6:
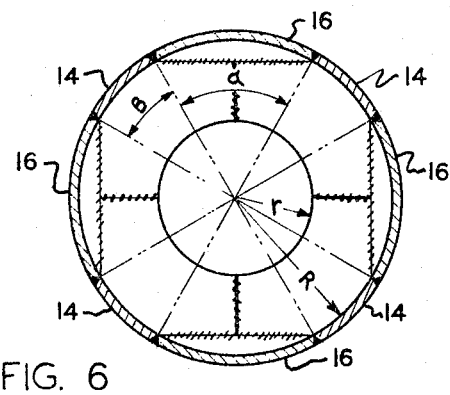
Figure 7:
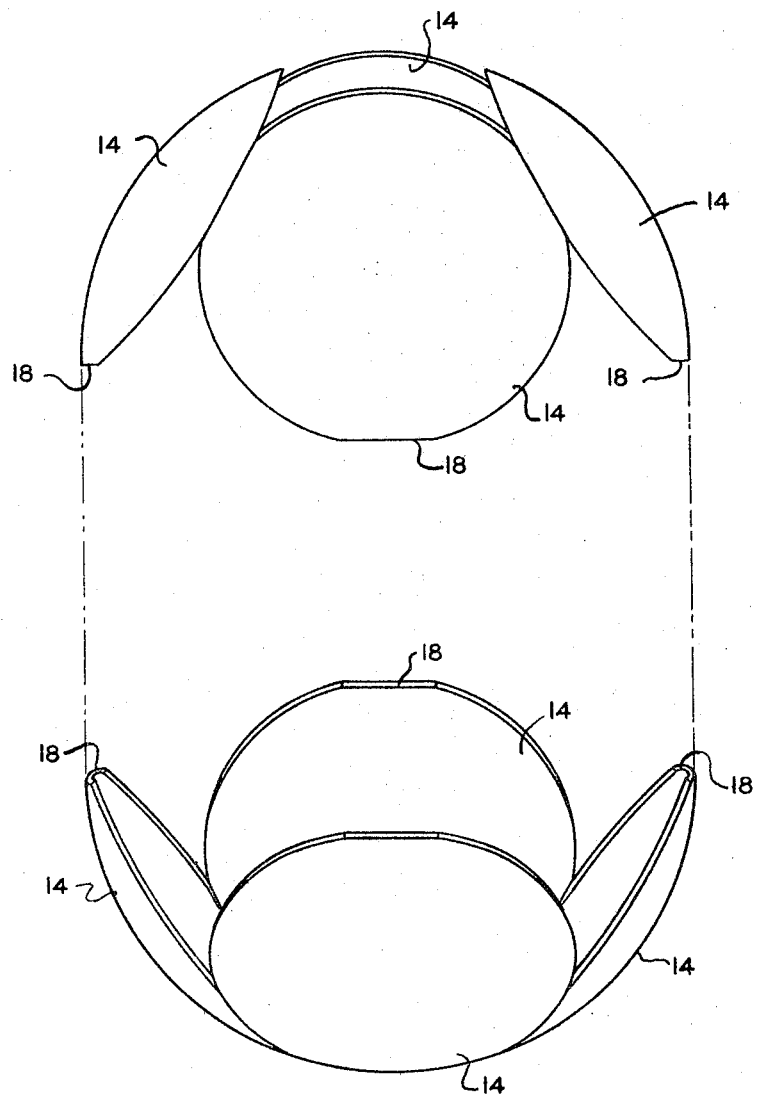
Figure 8:
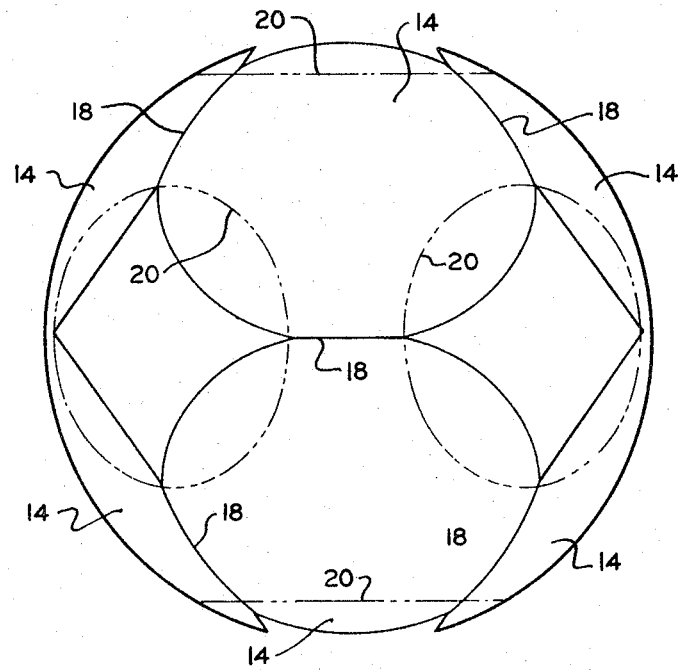
Figure 9:
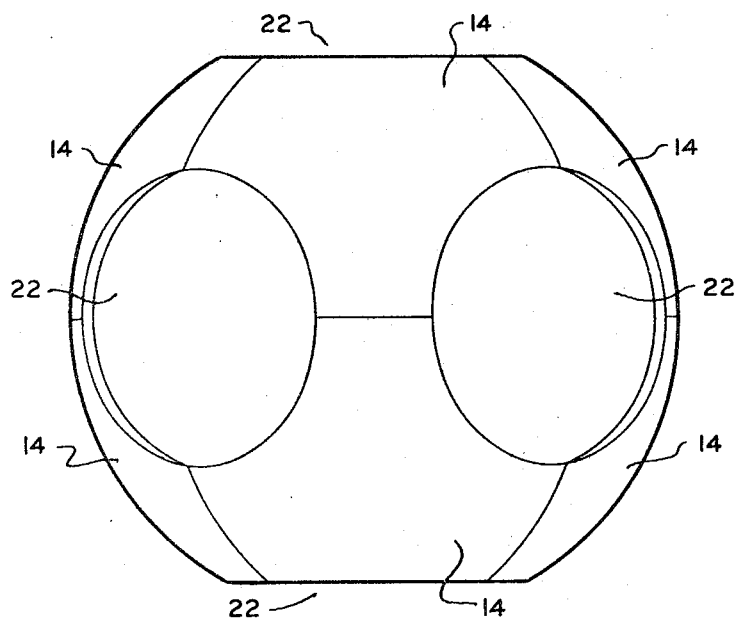
Figure 10:
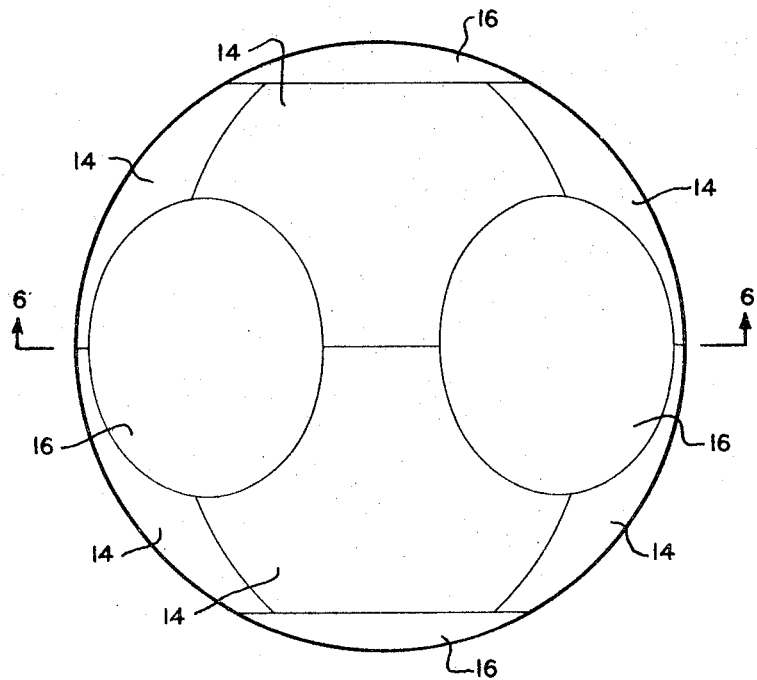

FIGURE 1 illustrates a typical application for a vessel constructed in accordance with the present invention;
FIGURE 2 illustrates one spherically formed plate section used in the invention;
FIGURE 3 is a sectional view taken along line 3—3 of FIGURE 2;
FIGURE 4 illustrates another spherically formed plate section used in the invention;
FIGURE 5 is a sectional view taken along line 5—5 of FIGURE 4;
FIGURE 6 is a sectional view of the spherical vessel shown in FIGURE 1;
FIGURES 7, 8 and 9 illustrate intermediate steps in the construction of the vessel;
FIGURE 10 illustrates the completed spherical vessel; and
FIGURES 11 through 15 illustrate the steps of a somewhat modified method of vessel construction.

Description of the preferred embodiments

In FIGURE 1 of the drawing numeral 10 indicates an application of a pressure vessel wherein the containment structure is a spherical vessel 12. According to the present invention the vessel 12 is constructed of a plurality of dished sections 14 and 16 that are weldedly united to form a sphere of desired dimensions. In the preferred embodiment of the invention the sections 14 and 16, FIGURES 2 through 5, comprise the two groups of spherical sections that make up the finished vessel. The assembly comprises eight sections 14 and six sections 16. They are all formed originally from rectangular flat metal plate of desired thickness which is first cut to provide flat circular discs. The discs are thereafter formed, as by means of spinning or pressing, to a dished shape having a radius of curvature that corresponds to the vessel radius. In forming the sections 14 and 16 the rectangular plates are cut into circular discs having dimensions as determined by the following formulae:

$$r_{14} = R\sqrt{\left(\sin\frac{\beta}{2}\right)^2 + \left(\frac{\cos\frac{\beta}{2}}{2\cos 30°}\right)^2}$$

$$r_{16} = R\sin\frac{\alpha}{2}$$

$$\theta = 2\arcsin\frac{r_{14}}{R}$$

$$r'_{14} = R\sqrt{2 - 2\cos\frac{\theta}{2}}$$

$$r'_{16} = R\sqrt{2 - 2\cos\frac{\alpha}{2}}$$

where:
r equals the chordal radius of a spherical section as indicated in FIGURES 3 and 5, respectively;
R equals the desired vessel radius;
α equals the sector angle of a hollow sphere corresponding to section 16;
β equals the complement of the angle;
θ equals the sector angle of a hollow sphere corresponding to section 14; and
r' equals the developed radius of a circular disc from which the respective sections are formed.

It has been determined that the optimum dimensions for reducing minimum wastage of material should be α=60°; β=30°; θ=76°.

After the flat discs corresponding to sections 14 and 16 are cut from the plate stock, they are each formed by spinning or pressing, depending on the plate thickness, into a dished shape having a radius of curvature that corresponds to that of the finished vessel. Next, the eight sections 14 are provided with slight chordal cuts presenting three flats 18 located on 120° spacing about the periphery of each section. These flats will locate the points of abutment of adjacent sections and provide convenient weld preps for depositing weld metal when uniting the adjacent sections.

As shown in FIGURE 7 the sections 14 are next weldedly assembled into two skeletal structures that are generally of hemispherical configuration. This step is accomplished by depositing four of the sections 14 in edge-to-edge relation with the flats 18 of adjacent sections in abutment such that weld grooves for depositing weld metal are formed. The step is repeated with the four remaining sections 14 to form the mating structure.

A convenient manner for assembling each of the generally hemispherical skeletal structures comprises placing the four sections 14 on an oscillatable table such that one of the flats 18 of each of the sections rests on the surface of the table and each of the other flats 18 faces a corresponding flat on the adjacent sections. The four sections are secured to the table by appropriate clamping apparatus and a weld backing bar is tack welded to each of the four weld grooves formed by the flats 18. The turntable is then inclined at an angle of 30° with the vertical and a welding torch is fixed in operative position with respect to the weld grooves. The table is then oscillated with respect to the torch such that beads of weld metal can be deposited in two of the weld grooves with each piece of the work beneath the torch. The position of the table with respect to the torch is changed such that the remaining connections can be similarly effected.

Next, the two skeletal hemispherical structures formed by the sections 14 are assembled as shown in FIGURE 8 by placing the flats 18 on the sections in one half in abutment with the similar flats on the sections that comprise the other half. A weld is thereafter effected along the weld preps formed by the abutments.

Following this, the next step in the process involves the removal, by cutting, of material along the circular paths indicated as 20 in FIGURE 8. As shown, the paths 20 extend around each of the sphere axes that pass through the centers of the cycloidally-shaped openings, indicated as 22, formed by the opposed edges of each of four connected sections 14. The paths 20, each of the four sections 14 and the ends of the flats 18 where the connection between adjacent sections is effected to produce circular openings 24 as shown in FIGURE 9. The openings 24 are filled by the insertion in place of the remaining circular sections 16.

This step can be conveniently accomplished by placing the skeletal structure on a turntable that is permitted to rotate with respect to a fixed cutting torch disposed a set distance from the axis of rotation of the table such that a cut of proper diameter can be made to remove that portion of the sections 14 that are circumscribed by the line 20.

The cutting torch should be inclined at an angle of about 30° with respect to the sphere axis about which relative rotation occurs such that the openings 24 produced by the cut will have radially inwardly tapering sides that conform to the tapered peripheral edges of the sections 16. The cut can then be effected by rotating the work with respect to the fixed tool. After cutting the opening 24, one of the sections 16 is inserted therein. The cutting torch is replaced by a welding torch, and the work is again rotated with respect to the torch such that welding of the section 16 in place is effected. Thereafter the skeletal structure is indexed with respect to the torch and the process repeated until all of the openings 24 are filled by sections 16. By turning the work with respect to the cutting torch, a circular opening 24 as shown in FIGURE 9 is provided. The opening 24 is of a dimension that permits reception of one of the sections 16. The remaining openings 20 are similarly filled by the remaining caps 16 to produce the finished vessel.

Figure 11:
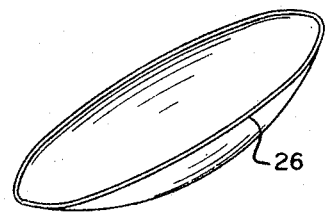
Figure 12:
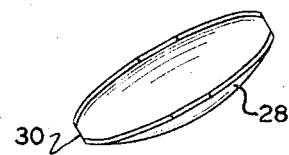
Figure 13:
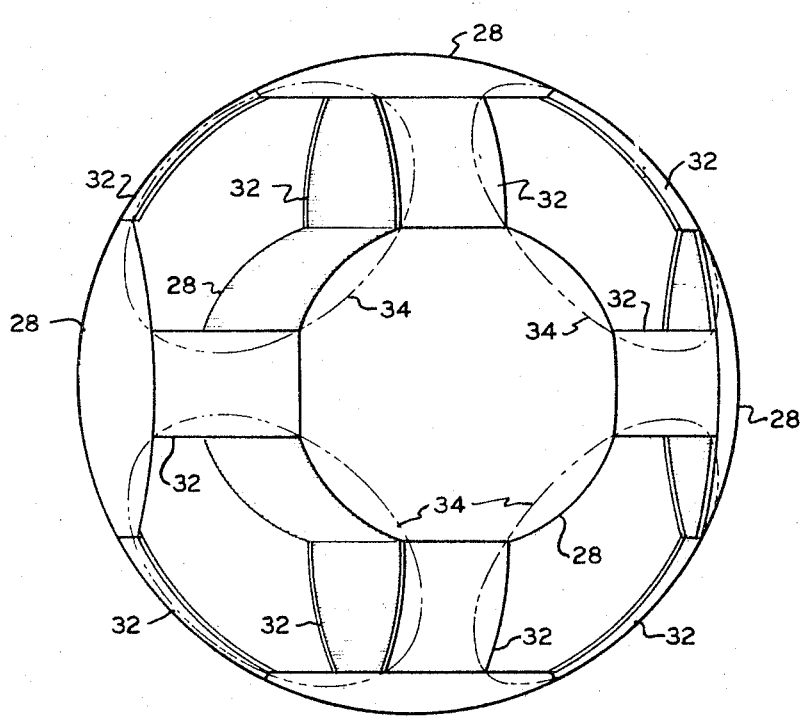
Figure 14:
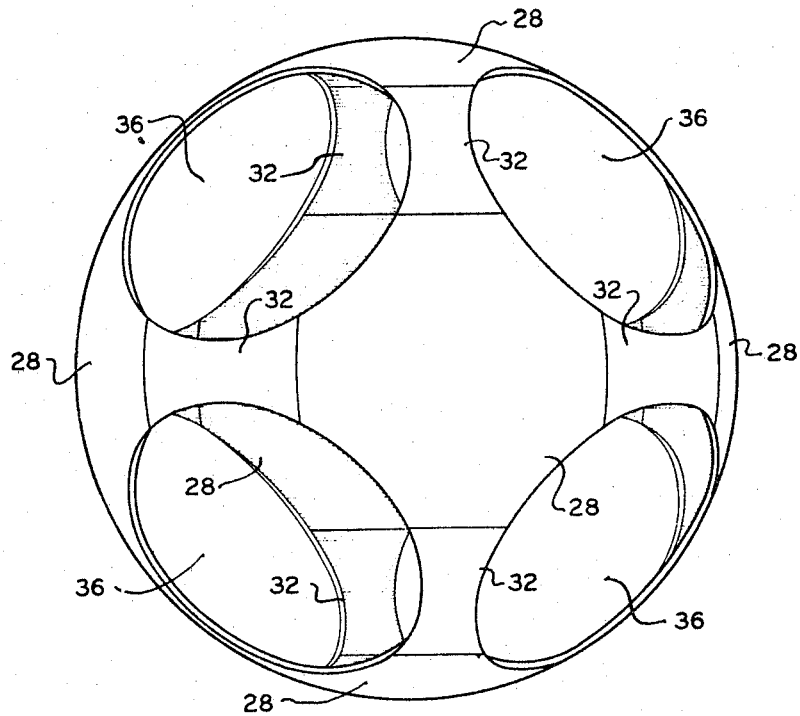
Figure 15:
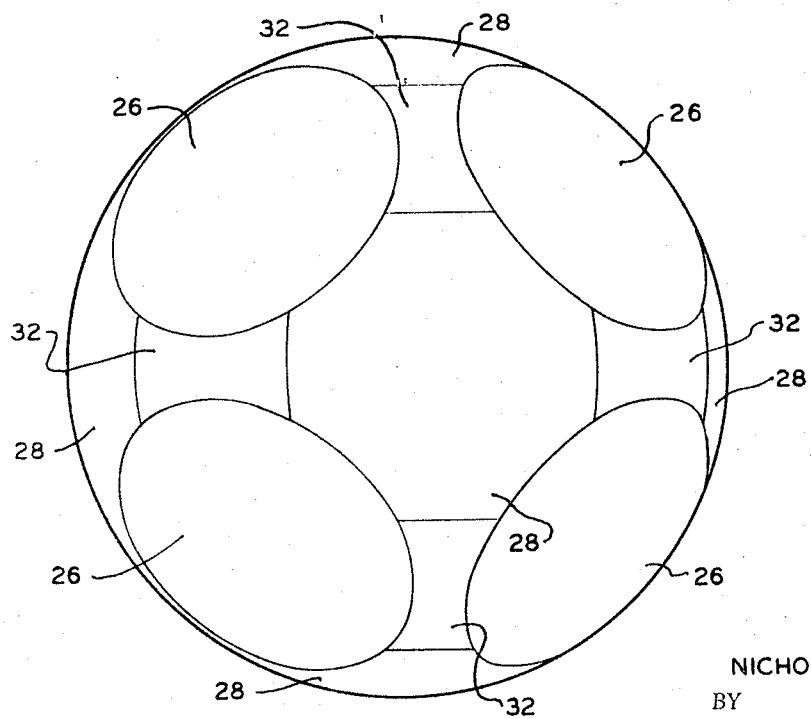

In FIGURES 11–15 there is shown a somewhat modified method of fabricating a spherical vessel. In this embodiment the groups of sections that comprise the vessel are indicated in FIGURES 11 and 12 as sections 26 and 28, respectively. Sections 26 are eight in number and correspond to the sections 14 of the first embodiment. Similarly sections 28 correspond to the sections 16. In the modified form of the invention the sections 28 are assembled directly into a skeletal structure that is of generally spherical configuration as shown in FIGURE 13. Each of the sections 28 are formed with four chordal flats 30 disposed on 90° spacing about the periphery of the sections. The flats 30 are adapted to receive the ends of connectors 32 that possess the same curvature as the dished sections 26 and 28. In assembling the skeletal structure the sections 28 are merely joined by means of the connectors 32 such that they each lie on the surface of the desired sphere. Circular cuts are affected along the paths indicated as 34 in FIGURE 13 to remove the material from the sections 28 and connectors 32 circumscribed by the paths.

In this embodiment the cuts affected along paths 34 and the attachment of sections 26 in the openings 36 formed thereby are provided in the same manner as employed in the first embodiment. The assembled spherical skeleton is attached to a turntable adapted to rotate about a vertical axis through the end with respect to a fixed tool that is so positioned as to affect a circular cut along the uppermost path 34 by rotation of the table with respect to the tool. After the opening 36 has been formed one of the sections 26 is positioned therein and the cutting tool is replaced by a welding torch such that the section 26 can be welded in place. This procedure is repeated until all of the openings 36 are filled by sections 26.

It will be understood that various changes in the details, materials, and arrangements of parts which have been herein described and illustrated in order to explain the nature of the invention, may be made by those skilled in the art within the principle and scope of the invention as expressed in the appended claims.

What is claimed is:

1. A method of fabricating a spherical vessel comprising the steps of:

(a) forming each of a number of circular discs as sections of a hollow sphere having the desired curvature, (b) attaching a plurality of said discs in assembled relation to form a generally spherical skeletal structure, (c) removing material from said structure along circular paths that substantially intersect the points of attachment of said discs such that all openings in said structure are circular, (d) attaching the remaining circular discs in said openings.

2. A method of fabricating a spherical vessel as recited in claim 1 wherein said plurality of discs are attached in edge-to-edge relation.

3. A method of fabricating a sperical vessel as recited in claim 2 including the step of providing chordal flats about the periphery of said plurality of discs at their points of abutment.

4. A method of fabricating a sperical vessel as recited in claim 2 wherein said plurality of discs comprise eight in number and said remaining discs are six in number including the steps of:

(a) attaching four of said discs in edge-to-edge relation to form each of two generally hemispherically-formed skeletal structures, (b) joining each of said hemisptherically-formed structures at substantially the points of tangency of the opposed discs in the respective structures to form a generally spherical skeletal structure.

5. A method of fabricating a spherical vessel as recited in claim 4 including the step of forming each of said eight discs with three chordal flats in equal spacing about their periphery.

6. A method of fabricating a spherical vessel as recited in claim 5 wherein said circular paths intersect said points of attachment at the ends of said flats.

7. A method of fabricating a spherical vessel as in claim 4 including the steps of:
(a) forming said eight discs as sectors of a hollow sphere having an included angle of about 76 degrees,
(b) and forming said six discs as sectors of a hollow sphere having an included angle of about 60 degrees.

8. A method of fabricating a spherical vessel as recited in claim 1 including the steps of:
(a) spacing six of said discs equidistantly about the surface of a sphere,
(b) and interconnecting said discs with connectors having the desired radius of curvature to form a generally spherical skeletal structure.

9. A method of fabricating a spherical vessel as recited in claim 8 wherein said connectors are attached at four equally spaced points about the periphery of said discs.

10. A method of fabricating a spherical vessel as recited in claim 9 including the step of providing chordal flats about the periphery of said discs for reception of said connectors.

References Cited

UNITED STATES PATENTS

| | | | |
|---|---|---|---|
| 2,474,149 | 6/1949 | Hume | 29—482 X |
| 2,668,634 | 2/1954 | Arne | 220—5 X |
| 2,731,334 | 1/1956 | Wissmiller et al. | 29—471.1 X |
| 3,046,647 | 7/1962 | Carstens | 29—471.1 X |
| 3,052,021 | 9/1962 | Needham | 29—471.1 |

JOHN F. CAMPBELL, *Primary Examiner.*

J. L. CLINE, *Assistant Examiner.*

U.S. Cl. X.R.

29—482; 220—5